United States Patent [19]
Patel et al.

[11] Patent Number: 6,019,203
[45] Date of Patent: Feb. 1, 2000

[54] SOLENOID VALVE IN AN AUTOMATIC TRANSMISSION

[75] Inventors: Sanjay Manilal Patel; Duane Zedric Collins, both of El Paso, Tex.

[73] Assignee: General Motors Corporation, Detriot, Mich.

[21] Appl. No.: 09/134,588

[22] Filed: Aug. 14, 1998

[51] Int. Cl.[7] .................................................. F16H 45/02
[52] U.S. Cl. ................. 192/3.3; 251/129.02; 251/129.15
[58] Field of Search .................................... 192/3.29, 3.3; 251/129.15, 129.02

[56] References Cited

U.S. PATENT DOCUMENTS

| | | | |
|---|---|---|---|
| 4,756,331 | 7/1988 | Stegmaier | 251/129.15 X |
| 4,988,074 | 1/1991 | Najmolhoda | 251/129.15 X |
| 4,988,604 | 1/1991 | Vukovich et al. | 192/3.3 |
| 5,346,175 | 9/1994 | Hunnicutt | 251/129.08 |
| 5,636,828 | 6/1997 | Brehm et al. | 251/129.15 X |
| 5,707,039 | 1/1998 | Hamilton et al. | 251/129.15 X |

*Primary Examiner*—Rodney H. Bonck
*Assistant Examiner*—Ankur Parekh
*Attorney, Agent, or Firm*—Margaret A. Dobrowitsky

[57] ABSTRACT

A transmission and control has a torque converter and clutch which is controlled between torque converter operation and torque converter clutch operation. The switch between these operations is controlled by a solenoid valve and a TCC apply valve. The solenoid valve is a normally open valve and includes a plunger that is spring loaded against a poppet valve to control the static pressure in the torque converter, during non-operating conditions of a vehicle, at or above a predetermined value.

3 Claims, 1 Drawing Sheet

SOLENOID VALVE IN AN AUTOMATIC TRANSMISSION

TECHNICAL FIELD

This invention relates to solenoid valves and more particularly to solenoid valves controlling fluid flow to a torque converter clutch in an automatic transmission.

BACKGROUND OF THE INVENTION

Automatic shifting power transmissions include a torque converter which provides torque multiplication at vehicle launch and also permits the vehicle to be held stationary and in gear without engine stall. The torque converter does reduce the overall efficiency of the powertrain during normal operation. To improve the efficiency, a torque converter clutch (TCC) is employed. The TCC is selectively engageable between the input impeller and output turbine of the torque converter to eliminate the fluid drive of the torque converter.

It is desirable to have the torque converter full of fluid when the engine is started to eliminate any lag or delay at vehicle launch. Thus, drain down of the torque converter to sump should be prevented. The drain down occurs when a normally open solenoid valve is connected in the control mechanism for the torque converter and clutch feed passage. The solenoid allows the torque converter to drain to sump over a period of time resulting in a delay between engine start and torque converter fill. Preventing or inhibiting the drain down phenomenon is accomplished, in current production transmissions, by installing a check valve and spring in the TCC release passage formed in the transmission input shaft. This shaft connects the turbine with the planetary gearing. This has generally been effective to prevent drain down. However, in some instances, drain down still occurs if the vehicle is idle for an extended period and the check valve and installation cost are high resulting in an increased cost of the transmission assembly. Another drawback to this solution is the flow restriction that the valve and spring introduce into the TCC release passage and the check valve can be inadvertently omitted at assembly requiring disassembly, repair and reassembly.

SUMMARY OF THE INVETION

It is an object of the present invention to provide an improved valve assembly for inhibiting drain down of a torque converter during periods when the vehicle engine is not operating.

In one aspect of the present invention, a solenoid valve and a check valve are combined to control the pressure in a torque converter.

In another aspect of the present invention, the check valve prevents the torque converter fluid from draining to a reservoir when the torque converter is not operating.

In yet another aspect of the present invention, the solenoid has a plunger which is spring loaded against a poppet valve to urge the poppet valve toward a closed position.

In a further aspect of the present invention, the spring acting on the plunger is not in the flow path of fluid entering or leaving the torque converter.

In a yet further aspect of the present invention, the solenoid valve is a normally open valve.

In a still further aspect of the invention, the poppet valve and spring force on the plunger are effective to maintain the pressure in a release passage of a torque converter clutch at or above a predetermined value.

In a yet further aspect of the present invention, the plunger under the influence of the spring is held in abutment with the poppet valve during periods when the vehicle is idle.

DESCRIPTION OF AN EXEMPLARY EMBODIMENT

Figure 1:
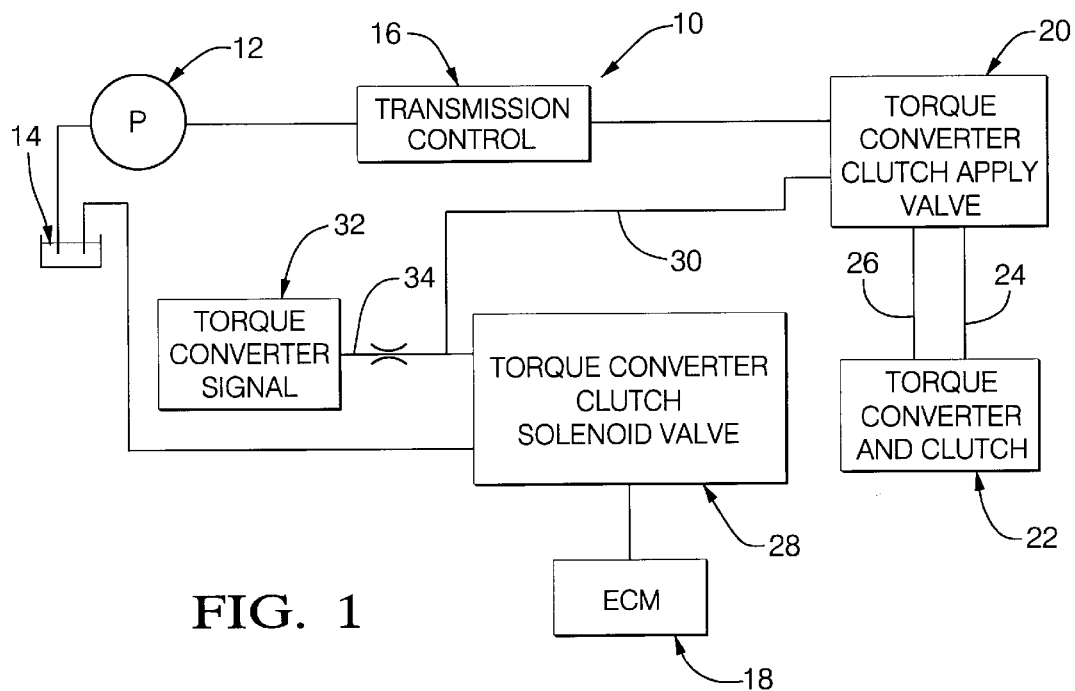
FIG. 1 is a diagrammatic view of a transmission control incorporating the present invention.

Automatic power shifting power transmissions have an electro-hydraulic control 10 for controlling the system pressure, ratio interchange functions, and torque converter pressure. The control 10, shown in FIG. 1, has a positive displacement pump 12 which draws hydraulic fluid from a transmission reservoir or sump 14 and delivers a pressurized fluid to a transmission control 16. The transmission control 16 receives control signals from an electronic control module (ECM) 18. The control 16 distributes fluid to various components of a power transmission, not shown, such as selectively engageable clutches and brakes, shift control valves and torque and speed signal valves. These devices are well known in the art of transmission controls.

The control 16 also delivers pressurized fluid to a torque converter clutch (TCC) apply valve 20. This valve 20 is a conventional spool valve, not shown, currently used in many commercial transmissions to control the distribution of fluid to and from a conventional torque converter and torque converter clutch (TCC) 22. The valve 20 delivers fluid through a passage 24 when only torque converter operation is desired and through a passage 26 when the (TCC) is to be applied. It is well known to reverse the fluid flow through the torque converter to either engage or disengage the TCC.

The valve 20 is controlled by a torque converter clutch solenoid valve 28 by way of a fluid passage 30. The solenoid valve 28 is a normally open valve, which generally means, the valve is open to exhausts when it is not energized. As will be hereinafter explained, the solenoid valve 28 of the present invention is designed to prevent this connection at low pressures. The valve 28 has a torque converter signal pressure 32 delivered thereto via a restricted passage 34. The valve 28 is also connected to the transmission sump 14. When solenoid valve 28 is energized by a signal from the ECM 18, the passage 30 is pressurized so that the TCC apply valve 20 will be placed in a pressure set position. In this position, passage 26 delivers fluid to the torque converter and clutch 20 while passage 24 returns fluid to the valve 20 for distribution to lubrication and cooling circuits of the transmission. This will cause engagement of the TCC in a well known manner. When the solenoid valve 28 is not energized, the valve 20 is spring set and the passage 24 delivers fluid to the torque converter and clutch 22 and the passage 26 returns fluid to the lubrication and cooling circuits. This will establish torque converter operation and disengagement of the TCC.

Figure 2:
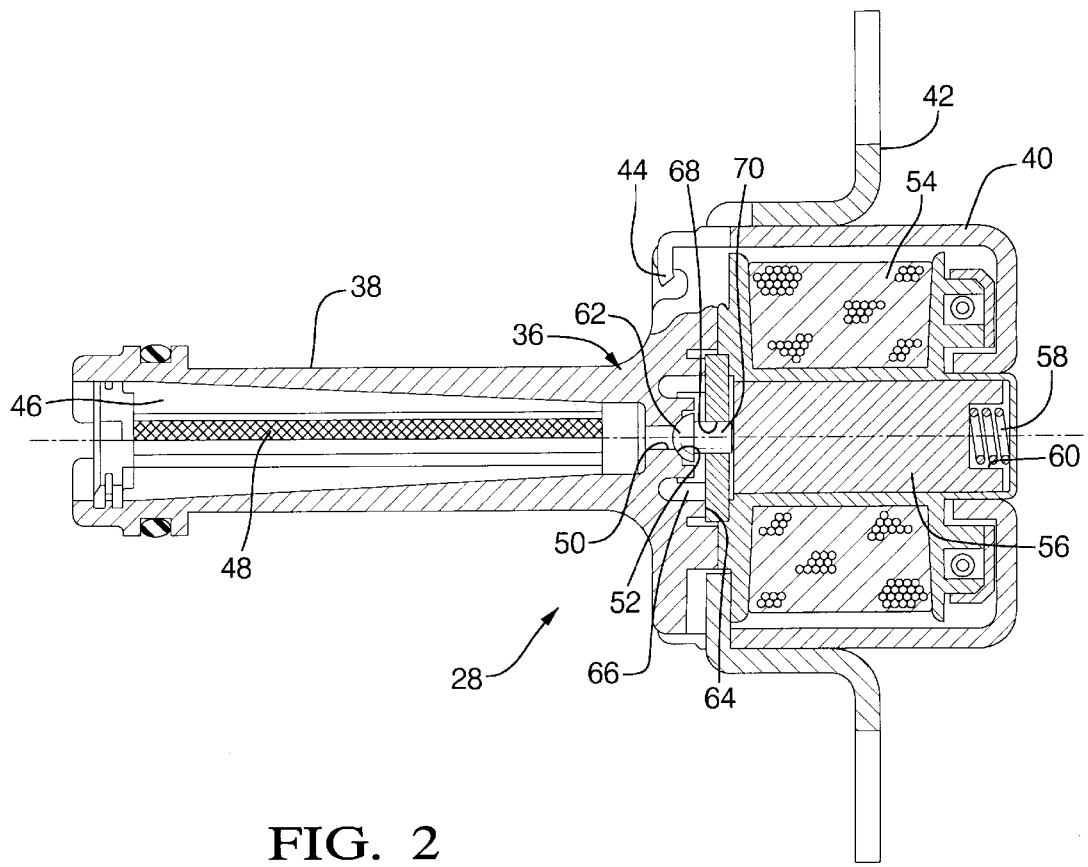
FIG. 2 is an elevational view, in section, of a solenoid valve incorporating the present invention.

The valve 28 is shown in more detail in FIG. 2. The valve 28 has a housing 36 comprised of a body 38, a cover 40 and a mounting plate 42. The cover 40 is secured on the body 38 by crimpings 44. The mounting plate is secured between the body 38 and the cover40. The body 38 has a longitudinally extending inlet pressure channel or passage 46 in which is positioned a conventional filter 48. The channel 46 terminates at a small diameter feed passage 50. A valve seat 52 is formed in the body 38 in fluid communication with the passage 50 and therefore channel 46. The channel 46 is also in communication with the passage 30.

The cover 40 encloses a solenoid coil 54, a solenoid plunger 56 and a spring 58. The plunger 56 is disposed for reciprocation in the coil 54. The spring 58 is seated in a longitudinally disposed recess or pocket 60 formed in the plunger 56 and is compressed between the cover 40 and the plunger 56. This urges the plunger 56 leftward as viewed in FIG. 2.

A poppet valve 62 and locator plate 64 are disposed between the cover 40 and the body 38. The locator plate 64 has an opening 68 in which a stem 70 on the poppet valve 62 is slidably disposed. The locator plate 64 is held in a fixed position between the body 38 and cover 40 to ensure the proper position and operation of the poppet.valve 62. The spring 58 and the plunger 56 urge the poppet valve 62 toward the seat 52 formed in the body 38. The spring 58 has a preload sufficient to hold the poppet valve 62 against the seat 52 against a fluid pressure of two pounds per square inch (2 psi) or less is present in the channel 46. Even though the valve 28 is a normally open solenoid valve, the poppet valve 62 is closed against a static pressure head of 2 psi in the torque converter and clutch 22. Testing has found this to be sufficient, in most instances, to maintain the torque converter filled with hydraulic fluid. This also eliminates the need for a separate and somewhat costly check valve in the clutch release passage, which is found in the prior art using normally open solenoid valves, to prevent drain down of the torque converter.

The 2 psi spring load is additive to the solenoid induced plunger load when the solenoid valve 28 is energized. This is easily compensated for, if necessary, by the ECM 18. The poppet valve 62 is not in fluid path during clutch release and therefore has no effect on the exhaust flow which is occasioned in the prior art. An area 66 establishing an exhaust port formed in the body 38 surrounding seat 52 is open to the reservoir 14. The fluid passing the poppet valve 62 is therefore directed to the reservoir 14.

When it is determined by the ECM that the TCC should be applied, the coil 54 is energized to urge the plunger 56 leftward, as viewed in FIG. 2, to increase the force on the poppet valve 62. This will cause an increase in the pressure in passage 30 which will result in the valve 20 being operated to connect passage 26 to pressure fluid from the transmission control 16. The TCC apply valve 20 will be conditioned to enforce engagement of the TCC by admitting fluid pressure to passage 26 while connecting passage 24 to the lubrication and cooling circuit. The passage 26 is also connected through a restriction, not shown, to the lubrication and cooling circuit. This restricted passage is provided because only a limited amount of fluid passes through the torque converter during clutch engagement.

We claim:

1. A transmission including at least one torque converter clutch apply valve connected to at least one clutch to hydraulically control the clutch comprising:

a normally open solenoid valve in fluid communication with the torque converter clutch apply valve, said solenoid valve comprising:

a plunger slidably disposed in a cover and surrounded by a coil energizable to urge said plunger in a first direction;

a spring compressed between said cover and one end of said plunger to also urge said plunger in the first direction;

an exhaust port, a feed port, and a poppet valve abutting said plunger at another end thereof and being disposed between said feed port and said exhaust port to control fluid flow therebetween, at least the exhaust port and the feed port being established by a valve body attached to the cover bv crimping, said spring applying a force via said plunger to said poppet valve to hold said poppet valve closed to establish a predetermined pressure in said feed port when said coil is deenergized, said solenoid valve operable when energized to increase the pressure at said feed port by urging said poppet valve to close said feed port and enforce engagement of the clutch and when de-energized to permit disengagement of the clutch and retain said minimum pressure in said feed port.

2. The transmission and control for a torque converter and clutch defined in claim 1 farther comprising: a longitudinal recess formed in said plunger around a portion of said spring.

3. The transmission and control for a torque converter and clutch defined in claim 1 further comprising:

a plate secured between said cover and said body, said plate having a central opening in which a stem on said poppet valve is slidably supported.

* * * * *